G. W RONEY.
Shovel Plow.
No. 26,620.
Patented Dec. 27, 1859.
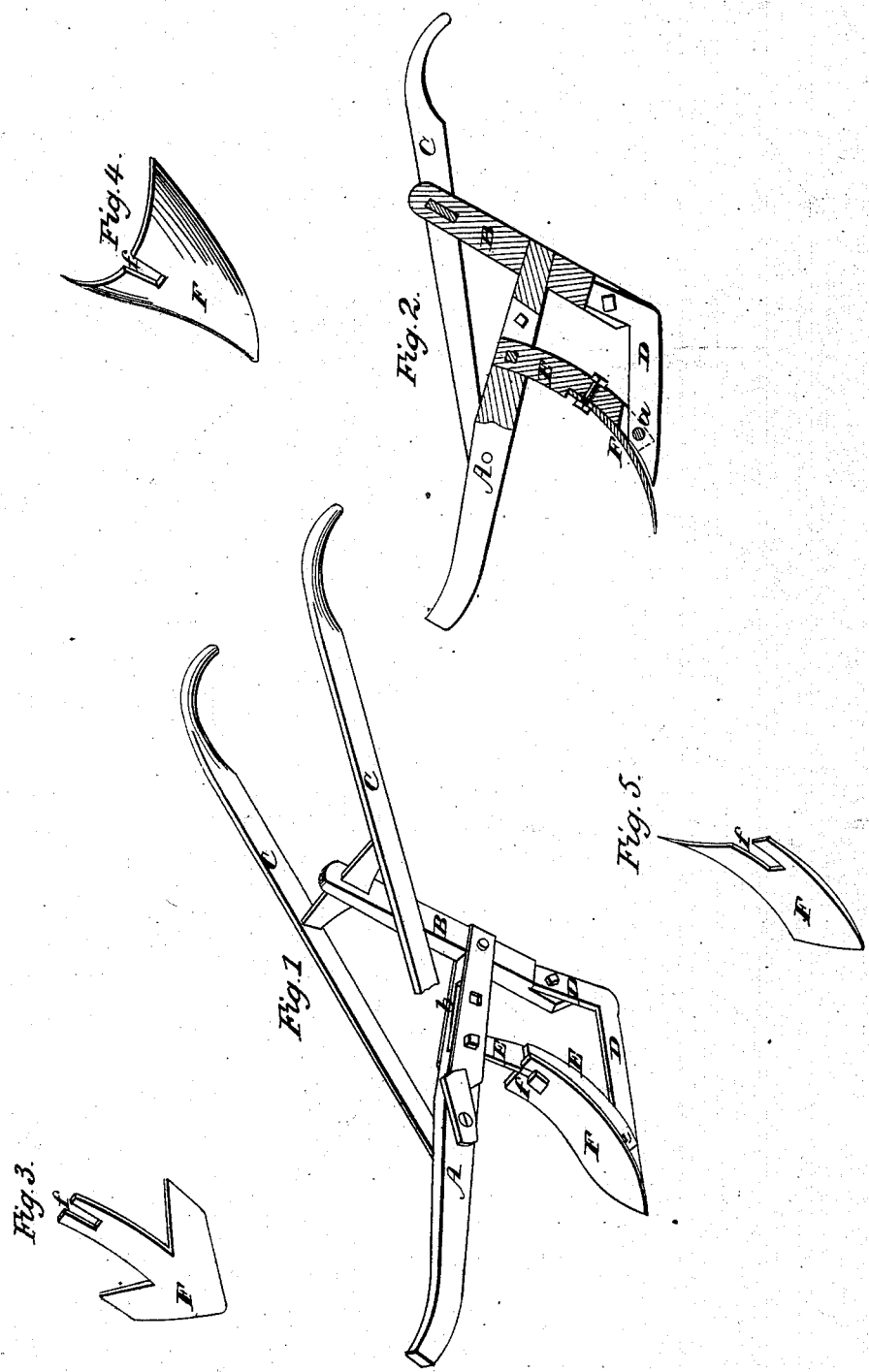

UNITED STATES PATENT OFFICE.

GEORGE W. RONEY, OF BALEY'S MILL, FLORIDA, ASSIGNOR TO HIMSELF AND WALTER F. LLOYD.

IMPROVEMENT IN PLOWS.

Specification forming part of Letters Patent No. 26,620, dated December 27, 1859.

*To all whom it may concern:*

Be it known that I, GEORGE W. RONEY, of Baley's Mill, in the county of Jefferson and State of Florida, have invented certain new and useful Improvements in Plows; and I do hereby declare the following to be a full, clear, and exact description of the construction of the same, reference being had to the accompanying drawings, making a part of this specification, in which—

Figure 1 represents a perspective view of the plow in one of its forms. Fig. 2 represents a sectional side elevation of the same. Figs. 3, 4, and 5 represent different forms of mold-boards which may be applied to the same stock.

Similar letters of reference, where they occur in the several figures, denote like parts of the plow in all the drawings.

I am aware that many varieties of the plow known as the "scooter plow" have been made and used, and some of them patented. They are exceedingly simple in construction and of light and easy draft and highly prized in light soils. There is of course but little to invent in this kind of plow, and that must be upon its special plan of construction, so as to make it available for the class of persons who are to use it and convertible from one to another kind of plow, as the special soil or plant to be cultivated may require.

To enable others skilled in the art to make and use my invention, I will proceed to describe the same with reference to the drawings.

A represents the plow-beam; B, a standard, and C C the handles, united to each other, as seen in Fig. 1. To the bottom of the standard B is bolted a shoe, D, and these enumerated parts of the plow—viz., A B C D—are permanent.

To the forward point of the shoe D is pivoted, by a bolt or pivot, *a*, a colter, E, so that it may swing forward or backward on said joint. The top or upper end of the colter passes into or through a slot, *b*, in the beam, and by means of suitable holes, *c*, and bolts *e* or wedges said top portion may be set and held at any required position that will give it the proper inclination for the special kind of mold-board that is to be used. When a mold-board F, such as is shown at Figs. 1 and 5, is to be used, (which is narrow,) the colter may be set in its most perpendicular position; but when such mold-boards as are shown in Figs. 3 and 4, and especially the latter figure, are to be used, then the colter must be more inclined, as the quantity of soil stirred up and lifted is much greater and must be raised and turned on a more gentle plane. I make the mold-boards with a notch or mortise, *f*, which receives the shank of the screw-bolt *i*, and when said bolt is tightened up the mold-board is secured in place, its lower end resting upon or against the curved end of the shoe. It will thus be seen that the only adjustment which I use is that of the colter swinging on the hinge *a*, and this alone makes all the changes that are necessary. This, too, leaves the shoe of my plow a fixture, as well as the beam, standard, and handles. The point will vary slightly by setting back the colter; but in practice it is not found to work an objection, as it is so slight.

I would state that I am aware plows have been made adjustable in various ways; but I lay no claim to any other adjustment than the one above described, and then only when used with the other permanent parts of the plow described; but What I do claim as my invention, and desire to secure by Letters Patent, is—

In combination with a beam, standard, handles, and shoe rigidly connected together, as shown, the hinging of the colter E to the shoe at *a* by its lower end and the adjusting devices in the beam at its upper end, as herein stated, and for the purpose set forth, the whole being constructed, arranged, and operating as herein represented.

GEORGE W. RONEY.

Witnesses:
E. COHEN,
JULIUS HIRSCH.